United States Patent
Nour et al.

(10) Patent No.: US 11,016,567 B1
(45) Date of Patent: May 25, 2021

(54) LETTER AND NUMBER RECOGNITION SYSTEM USING EEG-FNIRS FOR SPEECH IMPAIRED PEOPLE

(71) Applicant: King Abdulaziz University, Jeddah (SA)

(72) Inventors: Majid Nour, Jeddah (SA); Polat Kemal, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/990,487

(22) Filed: Aug. 11, 2020

(51) Int. Cl.
  *G09B 21/00* (2006.01)
  *G06F 3/01* (2006.01)
  *G06E 3/00* (2006.01)

(52) U.S. Cl.
  CPC ............. *G06F 3/015* (2013.01); *G06E 3/001* (2013.01); *G09B 21/00* (2013.01)

(58) Field of Classification Search
  None
  See application file for complete search history.

(56) References Cited

U.S. PATENT DOCUMENTS

| | | | |
|---|---|---|---|
| 2019/0247662 A1* | 8/2019 | Poltroak | A61B 5/04009 |
| 2019/0321583 A1* | 10/2019 | Poltorak | A61B 5/0488 |
| 2020/0086078 A1* | 3/2020 | Poltorak | A61M 21/02 |
| 2020/0086127 A1* | 3/2020 | Intrator | A61N 1/36082 |

* cited by examiner

*Primary Examiner* — James B Hull
(74) *Attorney, Agent, or Firm* — W&C IP

(57) ABSTRACT

A brain-computer interface (BCI) designed with a hybrid electroencephalography (EEG) and functional near-infrared spectroscopy (fNIRS) for letter and number recognition system for people who cannot speak. By this system, the words and numbers a subject thinks of are reflected on a display screen. A speech tool has been designed for these individuals allowing them to express themselves.

6 Claims, 7 Drawing Sheets

Layout plan of the EEG + FNIRS

LETTER AND NUMBER RECOGNITION SYSTEM USING EEG-FNIRS FOR SPEECH IMPAIRED PEOPLE

FIELD OF THE INVENTION

The present invention is generally directed to the field of brain-computer interfaces (BCIs) for human communication and, more particularly, to a BCI spelling system made by simultaneously receiving electroencephalography (EEG) signals and functional near-infrared Spectroscopy (fNIRS) signals. fNIRS is a noninvasive optical imaging technique that measures changes in hemoglobin (Hb) concentrations within the brain by means of the characteristic absorption spectra of Hb in the near-infrared range.

BACKGROUND OF THE INVENTION

Motor aphasia and other language and speech disorders cause disruption in communication, decrease in social activity, depression and the possibility of returning to work, and serious life quality deterioration. Language and speech rehabilitation methods are used in various hospitals and treatment centers, but aphasia remains in many patients. It is desirable to speed up the participation of the people who have problems in speaking with the high-performance spelling system and to increase the quality of daily life.

People use a variety of tools to communicate with machines: keyboards, mice, joysticks, touch-sensitive surfaces (screens of some bank ATMs, touchpad to guide the cursor on laptops, smartphones, special gloves, microphones, etc.). All these commanding tools allow the user's muscle system based on the assumption that it can control. However, this may not always be the case. Because, for example, amyotrophic lateral sclerosis (ALS), one of the motor neuron diseases, affects thousands of people and prevents people's voluntary movements. ALS attacks motor neurons in the brain and spinal cord, and the patient is unable to move any muscles in a short time. Diseases such as brain root trauma, brain or spinal cord injury, cerebral palsy, muscular dystrophies, and multiple sclerosis are known to affect many patients among the motor neuron problems leading to a similar situation. The brain-computer interface (BCI) can be called as the first step in this regard in order to communicate with electronic devices without using the muscular system. It is a very important technological development especially in terms of shedding light on the lives of paralyzed patients. In summary, BCI makes it possible for people to use a computer, an electromechanical arm or various neuroprostheses without using their muscular systems; in other words, nervous motor systems. Today, techniques such as electroencephalography (EEG), single cell registrations (SCR), functional magnetic resonance imaging (fMRI), regional field potentials (LFP), near infrared spectroscopy (NIRS), electrocorticography (ECoG), magnetoencephalography (MEG) are used for BCI applications. Since EEG is the fastest accessible, decision-making process earlier and practical among these techniques, BCI systems are generally tried to be developed based on EEG (See, for example, Aydemir, O., & Kayikcioglu, T. (2014), "Decision tree structure based classification of EEG signals recorded during two dimensional cursor movement imagery", *Journal of neuroscience methods*, 229, pp. 68-75, and Aydemir, O., & Kayikcioglu, T. (2013), "Comparing common machine learning classifiers in low-dimensional feature vectors for brain computer interface applications", *International Journal of Innovative Computing, Information and Control*, 9(3), pp. 1145-1157.) The user should encode his brain activity and commands to the mark and subtract commands from these marks by pattern analysis (feature extraction) and classification of the EEG signals recorded in the BCI. The resulting commands are used to control the computer monitor or another device (neuroprosthesis, electromechanical arm, etc.) (See Vidaurre, C., Klauer, C., Schauer, T., Ramos-Murguialday, A., & Müller. K. R. (2016). "EEG-based BCI for the linear control of an upper-limb neuroprosthesis" *Medical Engineering & Physics*, 38(11). pp. 1195-1204.)

SUMMARY

According to the present invention, in order to solve the problem of not speaking permanently in these patients, electroencephalography (EEG) and Functional Near-Infrared Spectroscopy (fNIRS) is used to predict which letter or number the signals received from the brain focus on using new signal processing and machine learning algorithms. The brain signals (EEG and fNIRS) received from healthy and unable-to-speak people have been measured, and these commands have been sent to the external environment. As a result of the evaluation, it has been determined automatically which control or which letter or number it corresponds to. This is a brain-computer (machine) interaction (BCI) application.

In the spelling (letter and number recognition) system designed with EEG signals, a P300 wave is obtained from the EEG signal, extracting the attributes from this obtained signal, and combining the classification algorithms. When the number of experiments is high (i.e., the number of repetitions), the classification accuracy rate increases. When the P300 wave obtained from the EEG signal is received simultaneously (synchronously) by receiving fNIRS signals, by extracting attributes from both EEG and fNIRS signals (by performing time and frequency analysis), a new spelling algorithm is created by learning machines which provides letter and number recognition system for people who cannot speak.

DETAILED DESCRIPTION

Figure 1:
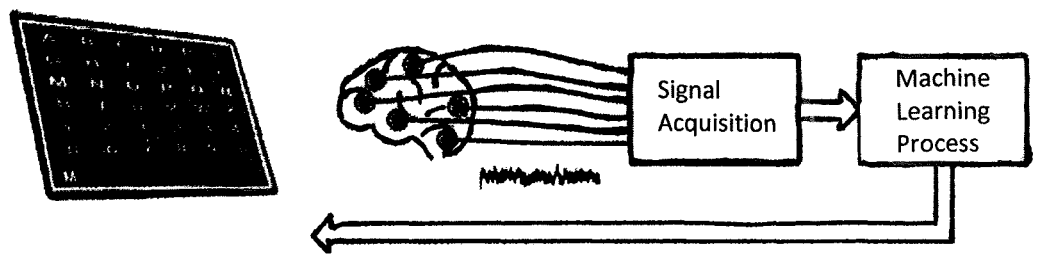
FIG. 1 is a block diagram of the basic components of a BC system.

Referring to FIG. 1, there is shown a representation of electrodes 10 attached to a subject which detect EEG signals. These signals are acquired by signal acquisition unit 12 which provides an output to a machine learning process 14. The machine learning process provides an output to, for example, a visual display 16 to provide visual feedback to the subject. EEG signals are low amplitude bioelectric signals detected by electrodes from the surface of the brain. The amplitude of these marks is in the range of 1-400 μV from top to top. Although the EEG signal has a wide frequency band, clinical and physiological interest is concentrated between 0.5 and 30 Hz. This frequency range is divided into four frequency bands. These are:

1. Delta (d) Waves: Their frequency varies between 0.5-4 Hz; their amplitude varies between 20-400 mV. It is encountered when the brain shows very low activity such as deep sleep and general anesthesia.
2. Theta (q) Waves: Their frequency varies between 4-8 Hz; their amplitude varies between 5-100 mV. In normal individuals; it is encountered when the brain shows low activity such as dream sleep, moderate anesthesia, stress.
3. Alpha (a) Waves: Their frequency varies between 8-13 Hz and their amplitude between 2-10 mV. Awake Individuals; they are seen when they are at full rest physically and mentally, have no external stimulation, and have eyes closed.
4. Beta (b) Waves: With frequencies greater than 13 Hz, their amplitude varies between 1-5 mV. Focused attention, mental work, sensory information processing, rapid eye movement stages of sleep are encountered.

Beta waves correspond to the highest level of activity. NIRS, which is a safe and harmless method that is not as painful as at least EEG, is based on the principle that the non-ionic light is sent from one side of the head and detected from the opposite side, which passes through the tissues. This measurement method is used to record brain activity. The frequency range is low compared to EEG and is usually recorded with a sampling frequency of 10 Hz. It can also provide significant advantages in terms of not being affected by motion-related artifacts as much as EEG.

About 100 years after the brain's electrical activity was discovered, the first BCI studies were presented by Jacques Vidal between 1973 and 1977 (Vidal, J. J., "Direct brain-computer communication", *Ann Rev. Biophys. Bioengng*, 2, 1973. pp. 157-158, and Vidal. J. J., "Real-time detection of brain events in EEG", *IEEE Proc.*, 65, 1977. pp. 633-664.) Vidal demonstrated in his studies how brain signals can be used to develop a mental prosthesis. BCI technology has come a long way after the first experimental study, which shows that cortical neurons made in 1999 can directly control a robotic arm. After this study, enormous research is being done in this area. Especially in the last 15 years, interest in BCI has increased. There are many innovative studies in this area. The main organizations that stand out especially in this field in the world are Berlin Technical University under the leadership of Benjamin Blankertz and Klaus-Robert Miller, and Wadsworth Center under the direction of Gert Pfurtscheller, Wadsworth Center (USA, NY) under the direction of Jonathan R. Wolpaw.

What matters to the basis of BCI is the fact that diseases like ALS affect only and only motor neurons; that is, it does not harm the patient's cognitive functions (brain). Memory, intelligence, and personality are preserved. Patients can see, hear, smell and interpret tactile stimuli. This means that if a technology can be developed that can directly interpret the neural activity in a person's brain, it may be possible for the person to communicate with the surrounding devices and people. Consequently, BCI is a research subject that can be used not only for ALS patients, but also in many application areas by controlling electronic devices such as computers, without the need for another intermediate layer (such as a muscular system), using direct thoughts.

The universities and research institutes that continue their work in the field of BCI conduct experiments related to different intellectual and visual situations. In the experiments, the method of recording EEG signals is generally two types, depending on the engine's dream or event. The subject of the experiments also varies according to the recording type. Experiments on right/left arm movement, up/down/right/left movement of the cursor, forward/back/stop of the wheelchair are performed depending on the engine imagination. P-300 syllable experiments are the leading studies related to event-related EEG. Moreover, studies of lie detector, smart home applications are also carried out.

P300 based BCI applications are frequently studied in the literature especially in terms of providing high accuracy performance. The P300 triggered potential is the positive potential generated by the brain approximately 300 ms after encountering a remarkable stimulus embedded in an irrelevant stimulus sequence. A typical P300 waveform resembles the Gaussian distribution, its half-width is 150 ms, and its intensity is up to 100 microvolts. Generally, it is necessary to average the many trials in order to obtain a clean P300 wave, and the reason for this is that the signal has a low signal rate per noise.

BCI systems using their P300 potentials are more recent. In a study, users of the system can choose the letter they want by looking at the flashing letters in the 6×6 matrix on the computer monitor. The performance of the system is about one word per minute. One of the advantages of P300 based BCI systems is that it does not require a long time to train the user; that is, the system becomes available in a very short time.

The main goal in BCI research is to increase the classification accuracy, and data bit rate reached. In P-300 based applications, classification accuracy is increased by giving a few stimuli in an experiment and averaging them. This approach contributes positively to classification accuracy and reduces the data bit rate. At this point, an optimization problem arises in such studies. A satisfactory classification accuracy rate and data bit rate are achieved in how many stimuli are given in an experiment. Furthermore, the duration of the stimulus in the trial (flashing time) and the transition time between other potential target stimuli will also change the data bit rate as it will affect the trial time. The data bit rate is calculated with the following formula:

$$BTR = \frac{60}{DS} \cdot \log2(N) + P\log2(P) + (1-P) \cdot \log2((1-P)/(N-1))$$

Here DS indicates the trial period, N is class quantity and the classification accuracy obtained in P. As it can be understood from this formula, flashing time and waiting time between flashing affect the data bit rate. The low data bit rate also causes the designed BCI application to run slowly, which is tiring for its user. Many of the studies in the field of BCI are based on EEG. NIRS based BCI applications or EEG plus NIRS hybrid applications are limited. EEG signs have a structure that can only be examined with high statistical methods. First of all, these signs should be subjected to a pre-processing, and unwanted signs (noise, network interference, environmental factors, etc.) should be thrown. EEG signals can be easily affected by many artifacts, making statistical analysis very difficult.

Some of the artifacts that can affect the EEG signals are:
motion-related artifacts
Artifacts connected to electrodes
Network-connected artifacts (Radio waves, electrostatic artifacts, city draft noise)
Artifacts due to disorder in the recorder Environmental artifacts The advantage of the simultaneous evaluation of the NIRS method, which is negatively affected by electrical and physical factors, and EEG records, which are less affected by such factors, can be seen here. In cases where sufficient information cannot be extracted, or additional information can be obtained, the performance of BCI application can be increased. The extraction of information from signs is expressed as feature extraction in the literature. By examining the features of the signs with the feature extraction process, what different characteristics (attributes) of the sign groups show in different intellectual and visual situations are examined. Then, the features extracted with classification algorithms are subjected to the classification process (FIG. 1).

The generation of appropriate commands to communicate with electronic devices such as computers in EEG-based BCI systems depends on the processing (feature extraction) of EEG signals occurring in different intellectual and visual situations and their classification based on the extracted features. EEG signals are very small in amplitude and can be easily affected by noise. In this regard, the noise interfering with the EEG signals is tried to be eliminated with a pre-processing interface before the feature extraction and classification processes. Various methods are used in the literature to remove noises from EEG signals. The most common are independent components analysis and filtering (linear and nonlinear) techniques. Methods such as wavelet transform, principal component analysis, source dipole analysis are also used as a noise removal method without losing neurological information. The noise source that is tried to be eliminated the most in the studies in the literature is the noise caused by blinking. This noise especially interferes with the marks on the electrodes located near the eye and in the occipital regions. In addition to the elimination of noises, operations such as averaging, threshold value determination, normalization, and signal improvement are also pre-treated. This step is a very important issue since the noise removal process causes the original sign to be distorted, which will negatively affect the feature extraction and classification steps. In this regard, when recording EEG signals, noise factors should be minimized as much as possible. In some cases, while noise factors are minimized, the information contained in the EEG signal can be lost. In this case. BCI can increase performance by using NIRS data as a hybrid in addition to EEG. As stated earlier, the number of BCI applications where EEG and NIRS approaches are used together is limited. Shin et al. And Fazli et al. demonstrated that this hybrid use increased BCI performance by performing motor-based hand opening/closing applications in their EEG plus fNIRS hybrid application. Among the hybrid applications, applications based on engine imagination are more common than applications based on P300.

In P300-based spelling applications, letters are flashed randomly with a certain paradigm, and P300 signals are captured with the response of the user to the sudden stimulus. In practice, paradigms affect BCI performance. In the literature, paradigms based on flashing line milk and regional-based flashing are frequently suggested. Regional-based paradigm has been used in the proposed patent since it has been determined that the regional-based paradigm performs higher.

P300-based spelling applications are mostly visual-based applications, and an auditory stimulus and a hybrid application were not used in conjunction with EEG and NIRS.

The general aim of publications in the field of BCI is to develop a method with a higher classification rate and brain-computer interfacing data rate than existing methods. There are many studies on this subject in the literature. Feature extraction can sometimes require very time-consuming sign analysis. Existing BCIs often use the following information to generate output commands: frequency domain information such as mu (8-12 Hz) and/or high beta (18-26 Hz) rhythm amplitudes, such as P300 and slow cortical potentials (YKP) or DC potentials. time-domain waveforms, power spectral density values autoregressive. AR and adaptive self-correlated parameters. By looking at the time domain averages of the educational data, one can get an idea of whether or not YKPs can be used, depending on whether the potentials of the signs recorded in different thinking situations differ. It is also possible to make a prediction on the frequency band that can be removed by examining which frequency region (delta, theta, alpha, beta) differs by looking at the frequency domain averages of the training data.

Classification of EEG signals recorded in different intellectual and visual situations according to the attribute vectors obtained is a very important issue in BCI technology. Deciding which class the sign belongs to should be both fast and accurate. There are many classification methods in the literature. The most used ones are support vector machines, k nearest neighbor (k nearest neighbor, k-NN), linear discriminant analysis (DAA), neural networks (neural networks), Bayesian classifier). Different classification algorithms can give different results in the same type of application. The k-NN algorithm is a controlled, rather simple learning algorithm, which is the result of classifying the query vector with the closest k-neighborhood vector. According to this, there are k neighbors closest to the feature vector to be recognized. Then, if this k neighbor belongs to the class is assigned as a result of recognition. The most practical way to determine the number of k is to choose k as less than the square root of the total number of training samples. In BCI applications, these closest k neighbors are usually obtained using a metric distance. The most widely used is the Euclidean distance-based metric. Although k-NN algorithms are not effective in large size feature vectors, they can be effective together with low size feature vectors. Support Vector machines (DVM), which is a statistical algorithm found by V. Vapnik in the late 1960s, are especially used in the classification of EEG marks with high dimensional attributes and gives much better results than traditional methods. It is formulated around the principle of structural risk minimization and tries to minimize the upper limit of expected risk.

DVM is a frequently used classification method in BCI studies because of its fast implementation and especially good results for high-dimensional attributes. Wenjie Xu et al. Studied the EEG data belonging to the movement of the right and left fingers from the data presented in the "BCI competition 2003" competition and supported this achievement by using slow cortical potentials and principal components analysis methods against the 84% success achieved in the competition. Provided the machines with a 90% success rate by classification method. In another study. Shang-Ming Zhou and others went for the dual-spectrum feature extraction and classification according to these characteristics from the EEG signals recorded by right and left-hand motor movements presented by the University of Graz at the "BCI competition 2003" competition. They tried the classification using linear discriminant analysis, support vector machines, and artificial neural network. Their result was better than the best result achieved in that competition. They achieved the best 90% classification performance with the DVM algorithm. DVM does not take into account the temporal information of the feature vectors during the classification process, such as k-NN, so they are static.

On the other hand, small changes in the training set in the DVM classifier do not affect the classification performance, so it has a stability feature. One difficulty in classification procedures is overtraining. In this case, the trained network perfectly matches the training samples, but may not give accurate results on the samples in the test set. Over-training can be prevented, and very good results can be achieved with the editing parameter in DVM.

Brain-computer interfaces (BCI), which provided people with a new communication channel, have gained increasing attention recently. Among many applications, BCI spelling (speller) systems are particularly valuable as they can help people with serious motor problems who have important diseases such as Amyotrophic lateral sclerosis (ALS), stroke, and spinal cord injury, with other people. Currently, electroencephalography (EEG) is the most popular method of applying BCI spelling systems due to the lack of interference, simple operation, and relatively low cost. However, the low signal-to-noise ratio (SNR) of the EEG signals recorded on the scalp and the absence of computationally effective solutions in EEG modeling limits the information transfer rates (ITR) of EEG-based BCI spelling systems to ~1.0 bits per second (Wolpaw). et al., 2002, Lebedev et al. 2006, Cecotti 2011, Gao et al. 2014, Xiaogang et al. 2015 (Cecotti H (2011). "Spelling with non-invasive brain-computer interfaces—current and future trends", *J Physiol Paris* 105(1-3): pp. 106-114; Gao S, Wang Y, Gao X. Hong B (2014), "Visual and auditory brain-computer interfaces", *IEEE Trans Biomed Eng* 61(5): pp. 1436-1447: and X. Chen. Y. Wang, M. Nakanishi. X. Gao. T.-P. Jung, S. Gao, "High-speed spelling with a non-invasive brain-computer interface", *Proc. Nat. Acad. Sci. USA*, vol. 112, no. 44, pp. E6058-E6067, 2015).

An important aspect of the present invention is in BCI spelling system design, simultaneously analyzing EEG signals as well as fNIRS signals to increase the information transfer rate (ITR) and achieve high accuracy. No such study has been found in the literature on real-time BCI spelling systems.

The original values of the project can be summarized step by step and in detail as follows. Both EEG and fNIRS signals have been recorded simultaneously, and a letter and number recognition has been designed. In literature, EEG, VEP, SSVEP signals are used in spelling systems. A spelling system has not been made by simultaneously receiving EEG and fNIRS signals. Thanks to this system, a new BCI spelling system has been added to the literature, making it a system that patients. As a stimulation in detecting and recognizing letters and numbers, a multi-modal stimulation model has been created by adding not only visual but also auditory stimulation.

In order to increase system recognition performance, both auditory and visual stimulation has been provided to focus on which letter or number the person will focus on. This system is the first application example for people with motor aphasia and non-speech problems. In general, spelling systems are designed for disease groups such as ALS and stroke. Motor aphasia patients am also included in the benefits provided this invention.

Figure 2:
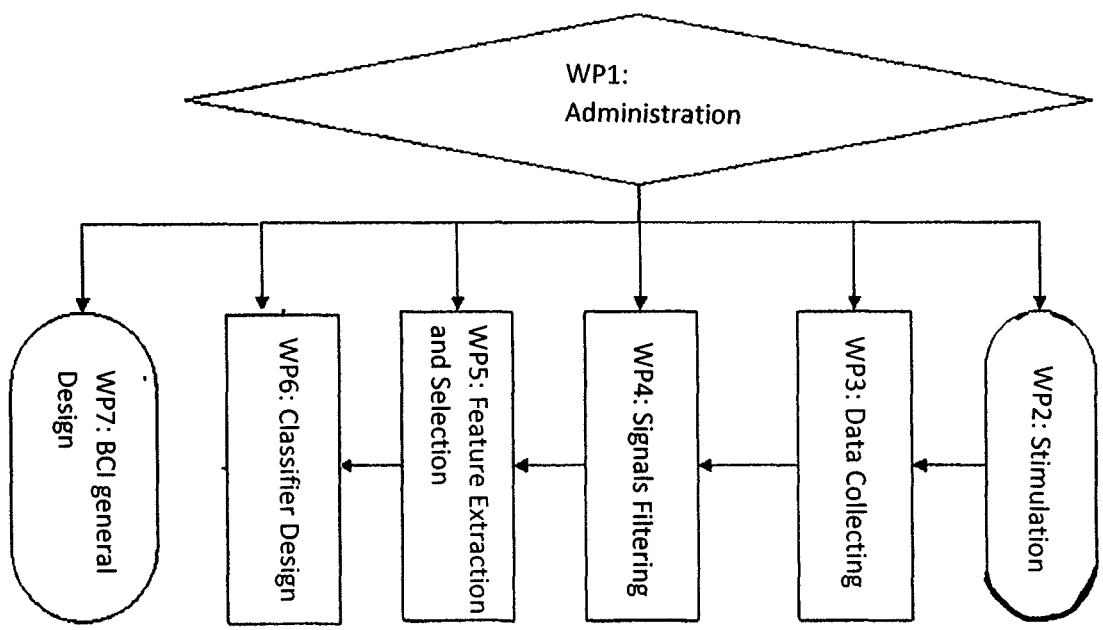
FIG. 2 is a flow diagram showing the processes implemented by the present invention.
Figure 3:
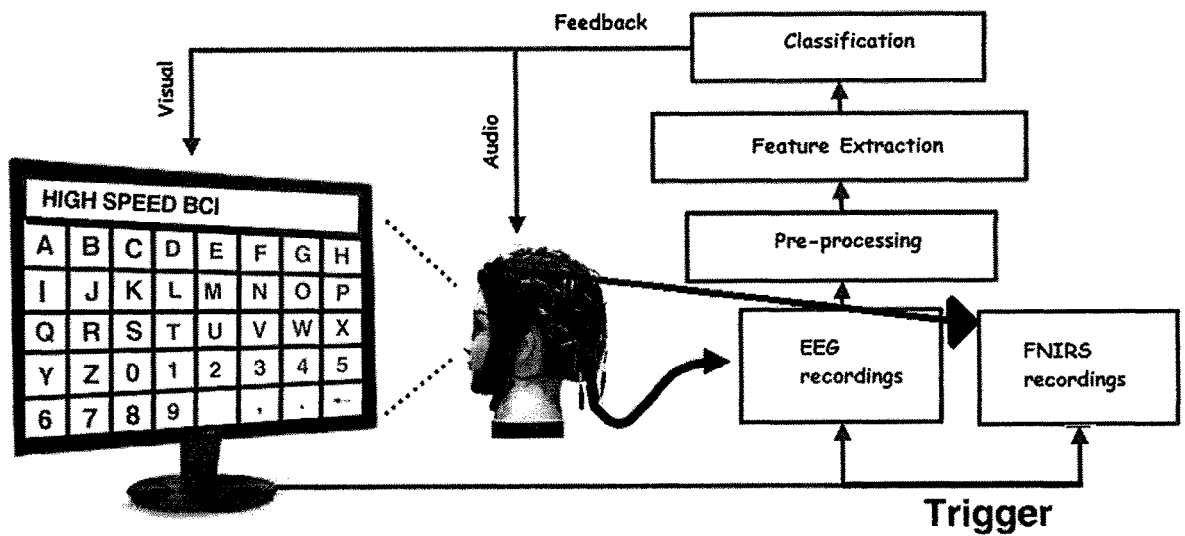
FIG. 3 is a block diagram showing in more detail the components of the present invention.

FIG. 2 illustrates the workflow of the invention as work packages (WPs) implemented in the system shown in FIG. 3. In FIG. 2, WP1 is Administration which is the controlling function for all the processes. WP2 is stimulation design. WP3 is data collecting. WP4 is signals filtering, WP5 is feature extraction and selection, WP6 is classifier design, and WP7 is BCI general design. These will be described in order.

Figure 4:
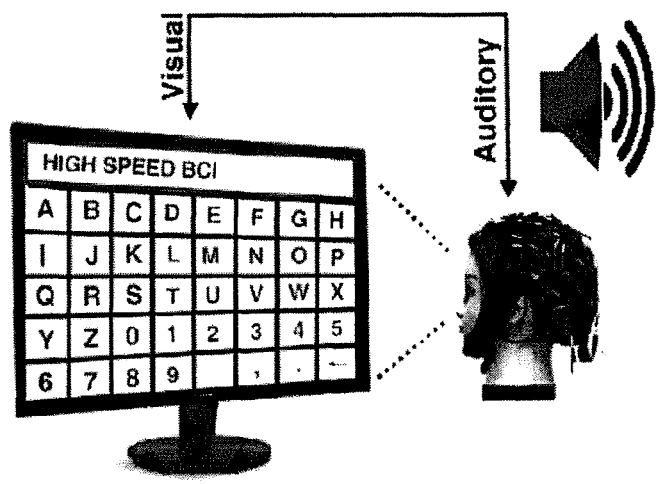
FIG. 4 is a block diagram showing the visual and audio stimulation demonstration used in the development of the invention.

Work Package WP2, Stimulation design: In the work package, we use both visual and audio stimulation synchronously. This enables getting both the EEG and fNIRS signals simultaneously and transferring them to work package WP3. In an embodiment of the present invention, a 5×8 visual and audio matrix has been used as visual and auditory stimulation. A 5×8 visual matrix was created, and 0.5 seconds were given between each character. At the same time, the character appearing on the screen was also audibly announced. In addition to the 5×8 matrix, it has been designed in a regional-based visual stimulus to test and improve performance. FIG. 4 shows the visual and audio stimulation demonstration used in the development of the invention.

Figure 5:
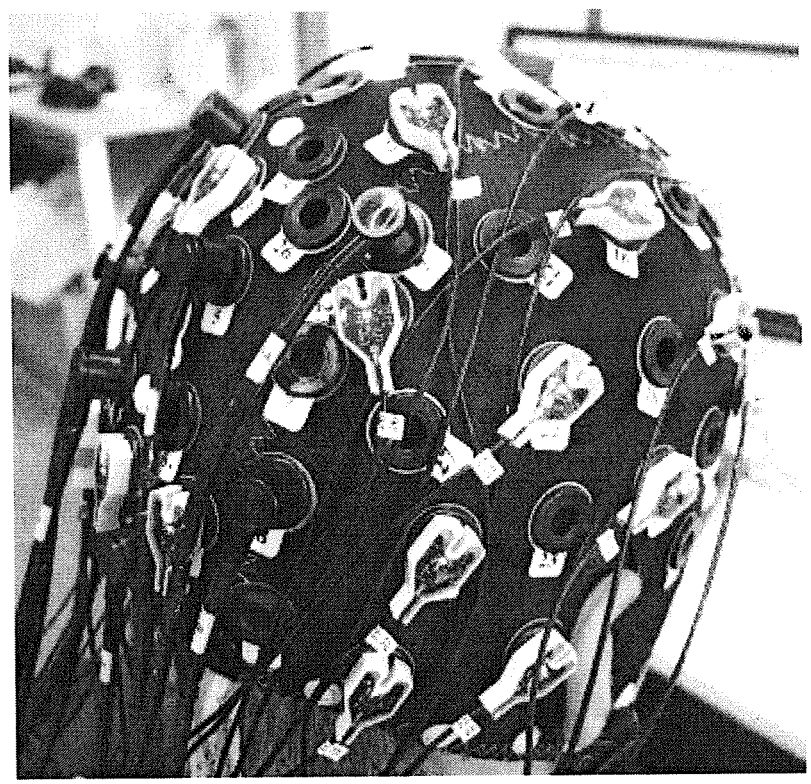
FIG. 5 is a pictorial representation of the layout of the EEG and fNIRS electrodes as used in the practice of the invention.

Work Package WP3, Data collecting: FIG. 5 shows the layout of the EEG plus fNIRS electrodes used on a patient. In the system, both EEG and fNIRS signals are received and recorded simultaneously. As seen in FIG. 3, thanks to a trigger system, both EEG and fNIRS electrodes have been activated, and registration has been done. Since the connection points of EEG and fNIRS electrodes are different, they give different neural activities. Therefore, in this invention, EEG-fNIRS signals have been detected together in order to achieve brain activity more comprehensively.

fNIRS (Functional Near-Infrared Spectroscopy) is a functional imaging technique that applies low-energy optical radiation (mostly 2-3 wavelengths) to evaluate absorption changes under the brain tissue. These absorption changes reflect changes in local concentration in the oxygenated and non-oxygenated hemoglobin triggered and associated with the change of neural activity. fNIRS is a non-invasive brain imaging technique.

Figure 6:
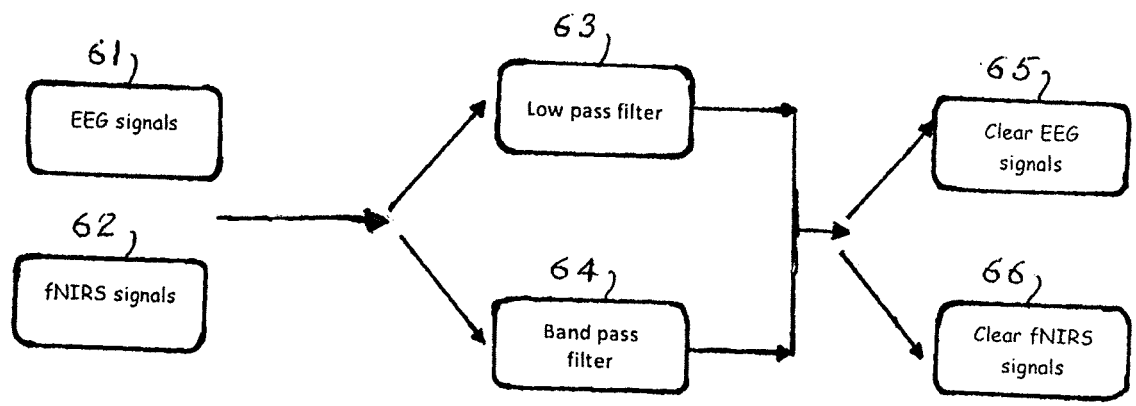
FIG. 6 is a block diagram of the signals filtering performed by the subject invention.

Work Package WP4, Signal Separation and Cleaning: The purpose of this work package is to prevent noise and artifacts that have been seen in the EEG and fNIRS signals during signal receiving processes. The frequency range of the fNIRS signal is generally between 3 and 5 Hz. Also, ambient light is important when acquiring fNIRS signals, and a low-pass filter has been used to extract ambient light noises. FIG. 6 illustrates the work package WP4. The acquired EEG signals 61 and fNIRS signals 62 include various kinds of noise. To clear these signals, low pass filtering 63 and band pass filtering 64 are used. The low pass filter cutoff frequency is 70 Hz. and the pass band for the band pass filter is 0.5-50 Hz. The noise removed by these filters are the white noise, artifacts, heartbeat (1~1.5 Hz), respiration (0.2~0.5 Hz), Mayer pressure (~0.1 Hz) related to blood pressure, and 50 Hz (or 60 Hz) line interference noise. The outputs from the filters are a clear EEG signals 65 and clear fNIRS signals.

Work package WP5. Feature extraction and selection: After filtering the EEG and fNIRS signals, the cleared signals are sent to the extraction and selection WP5 block. In the feature extraction part, we used the Hilbert Vibration Decomposition (HVD) method to decompose the EEG and fNIRS signals into small parts. For each part, the time and frequency domain features are extracted to determine the letter and/or number character. To select the best feature set from all the feature sets (the combination of time and frequency domain features from the EEG and fNIRS signals), the Neighborhood Components Analysis (NCA) is used as the feature selection. Thanks to this feature selection (FS) method, we have obtained less features for our characters.

Figure 7:
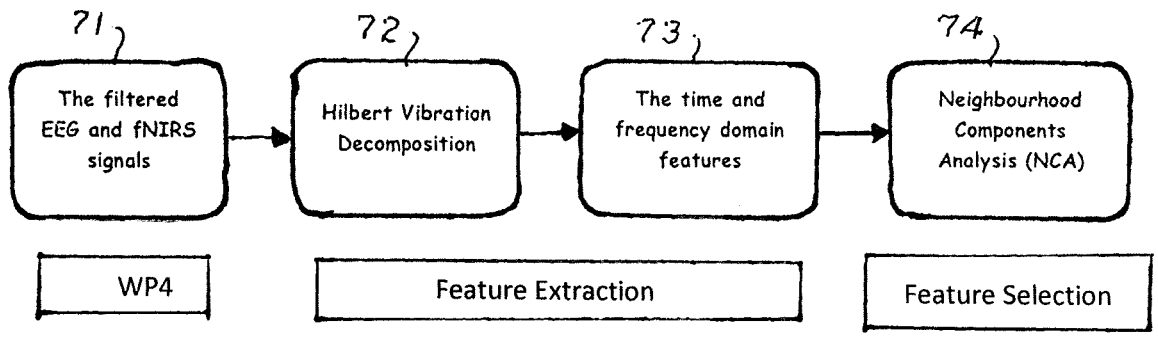
FIG. 7 is a block diagram of the feature extraction and selection processes performed by the subject invention.

FIG. 7 shows the working steps of the feature extraction and selection of our system. The filtered EEG and fNIRS signals from Work Package WP4 are input at 71. The Hilbert Vibration Decomposition (HVD) is used to extract the useful information from both the EEG and fNIRS signals at 72. This method is used the first time in the processing of both EEG and fNIRS signals (simultaneously) in this invention. By using the equation of 1, the EEG and fNIRS signals are decomposed simultaneously.

$$\psi(t)=s(t)+j\tilde{s}(t)=A(t)e^{j\phi(t)} \quad (1)$$

In Equation of 1, $\psi(t)$ is the analytic signal, $\emptyset(t)$ stands for the instantaneous phase, $d\emptyset(t)/dt=\omega(t)$ for the instantaneous frequency and $A(t)$ for the instantaneous amplitudes. $\tilde{s}(t)$ represents the Hilbert transform of the original signal $s(t)$.

$$\tilde{s}(t) = \frac{1}{\pi} \, P.V. \int_{-\infty}^{\infty} \frac{s(\tau)}{t-\tau} d\tau \quad (2)$$

After decomposing the EEG and fNIRS signals by HVD method, the time and frequency domain features from both signals have been extracted at 73. With extracting the feature set, we have created new feature set. To diminish the dimension of the feature set. Neighborhood Components Analysis (NCA) has been used as the feature selection in 74. After using the NCA method, we have obtained the reduced feature set to feed into the classifier work package WP6.

Since HVD is an approach based on analytical signal and Hilbert transformation, it would be useful to explain these concepts first. Next, the HVD technique and how to separate the signals into sub-components are explained. The analytical signal is a complex function where a signal expressed in the form of time series is on the real axis, and the Hilbert transformation of this signal is on the virtual axis. Thanks to this complex function, it is possible to estimate both the instantaneous amplitude and the instantaneous phase of a signal. The instantaneous frequency can be obtained by deriving the instantaneous phase by time. A signal consisting of many subcomponents can be expressed as the sum of harmonics with different instantaneous frequency and amplitude. Hilbert transformation and analytical signal calculation constitute the first stage of the methods to be used in order to find these sub-components.

i. Hilbert Vibration Decomposition (HVD): HVD is a technique to decompose non-stationary and multi-component signals into subcomponents, and it is based on analyzing the instantaneous frequency obtained after analytical signal calculation in time-space and the stages of HVD can be explained as follows: Calculating the Instantaneous Frequency of the Highest Energy Component: The general assumption of HVD is that the decomposed signal is formed by the overlapping of symmetrical and semi-harmonic signals, and these semi-harmonics have discrete envelopes. The simplest example to create a multi-component signal is a signal consisting of double harmonics and can be modeled as follows:

ii. Envelope Calculation: HVD uses the synchronous detection technique commonly used in the signal decoding literature to determine the envelope of a component whose instantaneous frequency is calculated. After calculating the average instantaneous frequency of the highest energy component, $<\omega(t)>$ as above, the first signal to be decomposed is multiplied by two reference signals with a phase difference of 90 degrees to obtain the in-phase and four projections. By taking the square roots of the amplitudes of these projections, the envelope of the highest energy component is calculated.

iii. Sub-Component Oscillation Extraction: It proposes a circular signal sequencing algorithm to decompose a signal consisting of many harmonics into its subcomponents.

After obtaining the analytical signal and then passing through the low-pass filter, the average instantaneous frequency of the highest energy component is estimated. The envelope of the highest energy component is calculated through the synchronous determination technique. This component, whose envelope and average instantaneous frequency is calculated, is removed from the first signal, and the same operations continue to be applied to the remaining signal.

Figure 8:
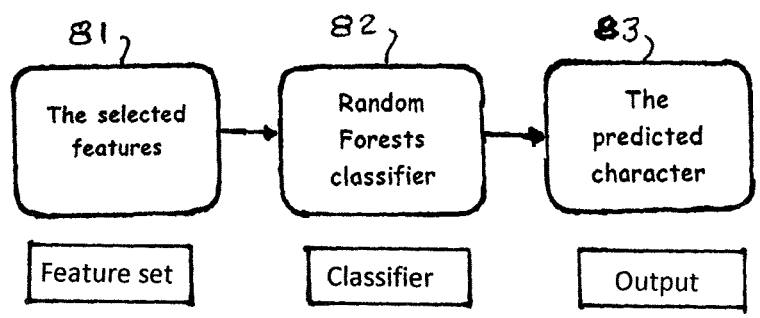
FIG. 8 is a block diagram of the classifier used in the practice of the subject invention.
Figure 9:
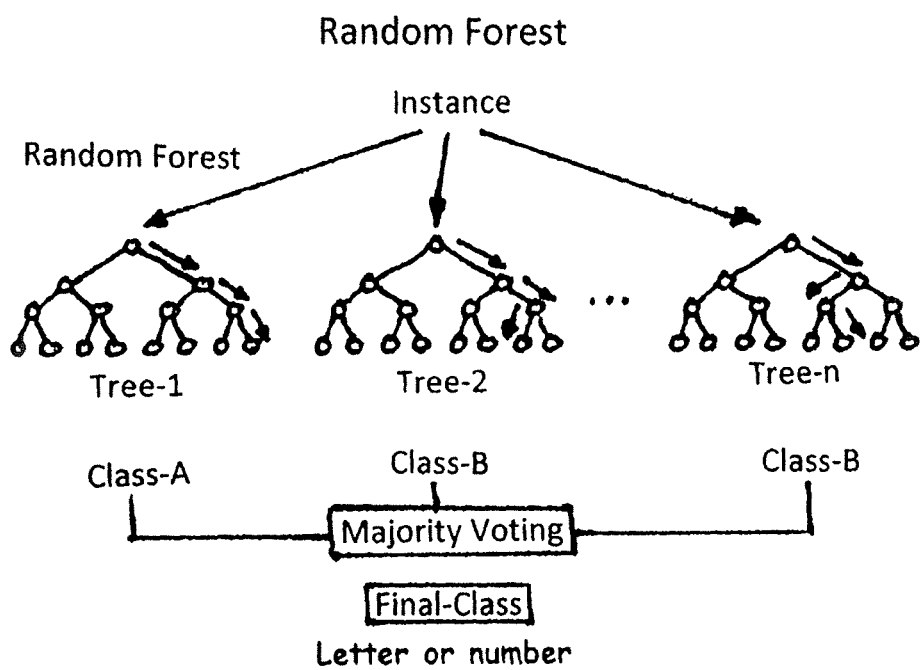
FIG. 9 is a diagram of the Random Forests (RF) classifier used in the classifier of FIG. 8.

Work Package WP6, Classifier Design for Machine Learning: The purpose of this work package is to realize the spelling system using the feature vectors obtained from EEG and fNIRS signals. This is shown in FIG. 8. After selecting the best features by the NCA method input at 81, the Random Forest (RF) classifier 82 is used to predict the letter and/or number character at 83. With this classification method, it has been planned to achieve a good performance since it is a multi-class dataset. The Radom Forest (RF) classifier is used to predict the letter and/or number character that the subject is thinking. The RF classifier is a bagging algorithm. It works as the ensemble learning for the classification and clustering process by constructing decision trees. To combine the outputs in the present invention, we have used the majority voting scheme. FIG. 9 illustrates the working of the Random Forest (RF) classifier algorithm. The inputs to the RF block 82 are the reduced feature set, while the outputs of this block are the predicted letter and/or number.

Figure 10:
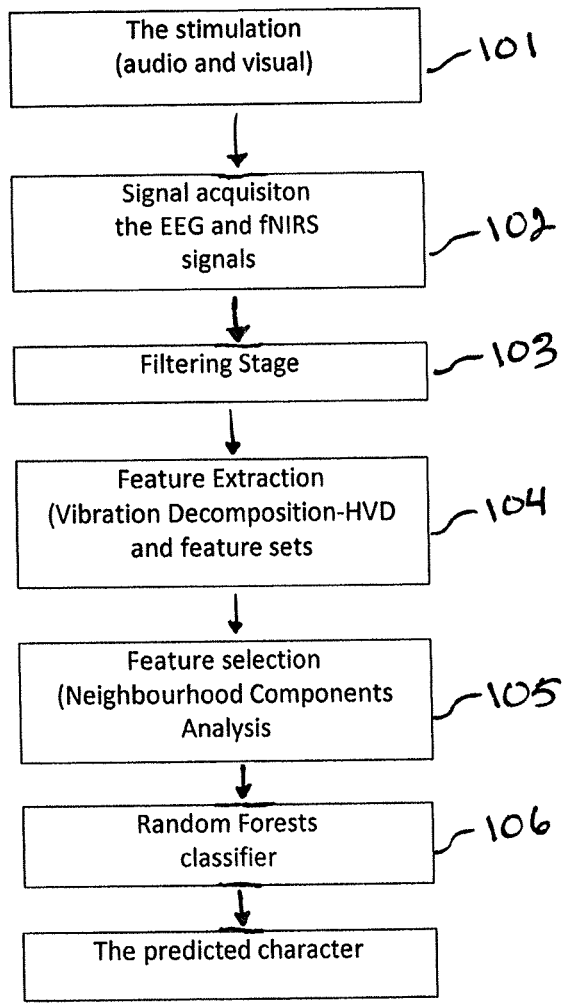
FIG. 10 is a block diagram illustrating by way of summary the BCI design of the subject invention.

Work Package WP7, Realization of BCI design: In this work package, general system design has been created by combining stimulation, signal acquisition, feature extraction and selection, and classification stages. And the character spelling has been displayed on the screen, and the spelling system has been realized. To summarize, the general system design is illustrated in FIG. 10, by combining stimulation 101, signal acquisition 102, filtering 103, feature extraction 104 and selection 105, and Random Forest (RF) classifier 106 to generate as an output a predicted character.

Figure 11:
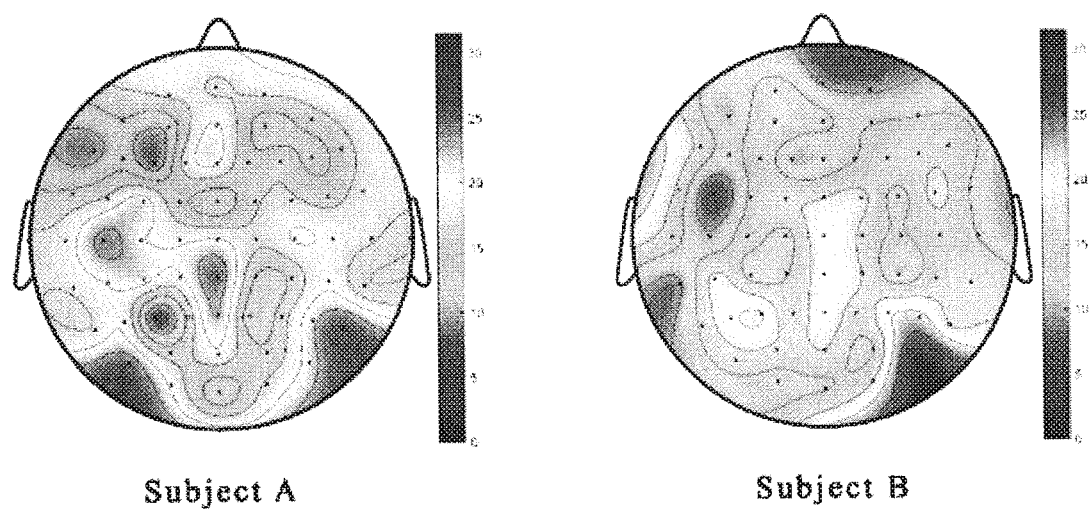
FIG. 11 is a pictorial representation of channel densities selected by electrode placement for two subjects.

A 64-channel system was used to obtain EEG signals. A genetic algorithm was used to select the best channels. The first results are given in FIG. 11.

For individuals who cannot speak or have difficulty in speaking (also for stroke patients), by this system and the mobile application, the words or numbers they think are reflected on the screen, and a speech tool has been designed for these individuals.

Individuals who cannot speak or have difficulty in speaking have the chance to be in social environments and express themselves better thanks to this invention.

Designed a new hybrid EEG-fNIRS brain-computer interface (BCI).

Created a letter and number recognition system for people who cannot speak.

Designed a new multi-modal stimulated BCI system based on EEG-fNIRS combination using new feature extraction methods and new machine learning algorithms.

The invention claimed is:

1. A real time brain-computer interface (BCI) spelling system comprising:
   a visual and audio stimulation device for simultaneously providing a visual display of letters and numbers for viewing by a subject and an auditory output of the letters and numbers displayed;
   an electroencephalograph (EEG) having electrodes for attachment to a subject's head;
   a functional near-infrared spectroscope (fNIRS) having electrodes for attachment to a subject's head;
   a controller for simultaneously triggering data collection from the EEG and the fNIRS in response to visual and auditory signals from the stimulation device, wherein the data collection comprises EEG signals from the EEG and fNIRS signals from the fNIRS;
   a feature extraction and attribute selection circuit for selecting attributes from the EEG and fNIRS signals simultaneously and outputting feature vectors; and
   a classifier circuit configured to use the feature vectors output from the feature extraction and attribute selection circuit to classify the EEG and fNIRS signals as letters and numbers recognized by a subject, the classifier circuit providing output to the stimulation device as a feedback to the subject.

2. The BCI spelling system of claim 1, further comprising a pre-processing circuit for preventing noise and artifacts in the EEG and fNIRS signals prior to inputting the EEG and fNIRS signals to the feature extraction and attribute selection circuit.

3. The BCI spelling system of claim 2, wherein the pre-processing circuit includes low pass and bandpass filters configured to produce clear EEG signals and clear fNIRS signals for input to the feature extraction and attribute selection circuit.

4. The BCI spelling system of claim 1, wherein the feature extraction and attribute selection circuit comprises; a Hilbert Vibration Decomposition (HVD) circuit configured to receive the EEG signals and the fNIRS signals and decomposing both said signals simultaneously; a time and frequency domain features extraction circuit configured to receive the decomposed signals from the HVD circuit; and a Neighbor Components Analysis (NCA) circuit configured to receive the extracted features from the time and frequency domain features extraction circuit and produce a feature set for input to the classifier circuit.

5. The BCI spelling system of claim 1, wherein the classifier circuit is configured to receive a feature set from the feature extraction and attribute selection circuit and comprises a Random Forest (RF) classifier to construct decision trees and combine outputs of the decision trees using a majority voting scheme and generate a predicted output of the letter and/or number a person is thinking.

6. A real time brain-computer interface (BCI) spelling system comprising: a visual and audio stimulation device for simultaneously providing a visual display of letters and numbers for viewing by a subject and an auditory output of the letters and numbers displayed; an electroencephalograph (EEG) having electrodes for attachment to a subject's head; a functional near-infrared spectroscope (fNIRS) having electrodes for attachment to a subject's head; a controller for simultaneously triggering data collection from the EEG and fNIRS in response to visual and auditory signals from the stimulation device, wherein the data collection comprises EEG signals from the EEG and fNIRS signals from the fNIRS; a feature extraction and attribute selection circuit for selecting attributes from the EEG and fNIRS signals simultaneously and outputting feature vectors, wherein the feature extraction and attribute selection circuit comprises a Hilbert Vibration Decomposition (HVD) circuit for receiving the EEG signals and the fNIRS signals and decomposing both said signals simultaneously, a time and frequency domain features extraction circuit for receiving the decomposed signals from the IIVD circuit, and a Neighbor Components Analysis (NCA) circuit for receiving the extracted features from the time and frequency domain features extraction circuit to produce a feature set for input to the classifier circuit; and a classifier circuit configured to use the feature vectors output from the feature extraction and attribute selection circuit to classify the EEG and fNIRS signals as letters and numbers recognized by a subject, the classifier circuit configured for providing output to the stimulation device as a feedback to the subject, wherein the classifier circuit is configured for receiving a feature set from the feature extraction and attribute selection circuit and comprises a Random Forest (RF) classifier configured to construct decision trees and combine outputs of the decision trees using a majority voting scheme to generate a predicted output of the letter and/or number a person is thinking.

* * * * *